US008272563B1

(12) United States Patent
Folk et al.

(10) Patent No.: US 8,272,563 B1
(45) Date of Patent: Sep. 25, 2012

(54) SECURITY TO PREVENT TRANSACTION ACTIVITY UNTIL AUDIT IS COMPLETE

(75) Inventors: Amy Baker Folk, Charlotte, NC (US); Daniel Christopher Bohen, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 478 days.

(21) Appl. No.: 12/212,446

(22) Filed: Sep. 17, 2008

(51) Int. Cl.
*G06Q 40/00* (2006.01)
*G07D 11/00* (2006.01)
*G07F 19/00* (2006.01)

(52) U.S. Cl. ............................... 235/379; 705/43; 902/8

(58) Field of Classification Search .................. 235/379, 235/380, 375; 705/16, 43; 902/8–22; 194/206
See application file for complete search history.

(56) References Cited

U.S. PATENT DOCUMENTS 4,355,369 A * 10/1982 Garvin .......................... 235/379
4,660,168 A * 4/1987 Grant et al. .................. 705/7.12
5,553,320 A * 9/1996 Matsuura et al. ............. 235/379
5,676,456 A * 10/1997 Sharp ............................ 362/318
5,884,745 A * 3/1999 Kalis et al. .................... 194/217
6,422,458 B1 * 7/2002 Katou et al. .................. 235/379
6,474,549 B2 * 11/2002 Katou et al. .................. 235/379
7,610,215 B1 * 10/2009 Folk et al. ....................... 705/16
7,780,071 B1 * 8/2010 Ramachandran et al. .... 235/375
2003/0163388 A1 * 8/2003 Beane ............................. 705/26
2007/0108267 A1 * 5/2007 Jonsson et al. ................ 235/379
2009/0089187 A1 * 4/2009 Hoersten et al. ................ 705/28
2010/0025183 A1 * 2/2010 Folk et al. ..................... 194/200

* cited by examiner

*Primary Examiner* — Michael G Lee
*Assistant Examiner* — Suezu Ellis
(74) *Attorney, Agent, or Firm* — Banner & Witcoff, Ltd.; Michael A. Springs

(57) ABSTRACT

Methods and devices provide security to prevent transaction activity until an audit is complete. A cash handling device such as, for example, a cash recycler may include a processor for executing computer-executable instructions, memory that stores the computer-executable instructions, and an input means for receiving user input. The computer executable instructions may cause the apparatus to: allow a first input to the input means in order to indicate that an audit is to be performed, prevent any further transactions on the cash handling until the audit is complete, allow a second input to the input means in order to indicate that the audit is complete, and allow any further transactions to proceed after the audit is complete.

20 Claims, 5 Drawing Sheets

SECURITY TO PREVENT TRANSACTION ACTIVITY UNTIL AUDIT IS COMPLETE

BACKGROUND

In some instances, an audit may be necessary to verify an amount of money in a cash handling device (e.g., a cash recycler). In order perform an audit (e.g., rebalancing), money in the cash recycler may need to be extracted and then re-inserted in order to make sure that the before and after balances match. However, if transactions are allowed to take place before the audit is complete, then the results of the audit might not be accurate.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

In accordance with various embodiments of the present invention, methods and devices can provide security to prevent transaction activity until an audit is complete.

In one embodiment, a first selection may be entered on a cash handling device indicating that an audit is to be performed. The cash handling device may prevent one or more transactions on the cash handling until the audit is complete.

In another embodiment, a second selection may be entered on the cash handling device indicating that the audit is complete.

In yet another embodiment, on ore more transactions may be allowed to proceed on the cash handling device after the audit has been completed.

In still another embodiment, the cash handling device may be a cash recycler.

In another embodiment, a first selection on a cash handling device may be allowed in order to indicate that an audit is to be performed. The cash handling device may prevent any further transactions on the cash handling until the audit is complete. The cash handling device may allow a second selection in order to indicate that the audit is complete. The cash handling device may allow all further transactions to proceed after the audit is complete.

In addition, the foregoing embodiments can be implemented in an apparatus that includes a processor for executing computer executable instructions, memory that stores the computer executable instructions, an input means for receiving user input, a display for displaying information to the user and, optionally, to receive input from a user. Each of the above-identified method steps can be implemented as computer-executable instructions that are stored in the memory and executed by the processor.

In another embodiment, an input means and display may include a touch sensitive screen.

In yet another embodiment, the input means may include a touch-sensitive screen. The input means may also be a microphone that allows for voice recognition.

In still another embodiment, the display may include a touch sensitive screen.

In other embodiments, the input means may include a keypad or keyboard.

Additional features and advantages of the invention will be apparent upon reviewing the following detailed description.

BRIEF DESCRIPTION OF THE DRAWINGS

The present disclosure is illustrated by way of example and not limited in the accompanying figures in which like reference numerals indicate similar elements.

DETAILED DESCRIPTION

In accordance with various aspects of the disclosure, systems and methods are illustrated for providing blind withdrawal of currency for transportation.

Aspects of the present disclosure relate to cash handling devices. Cash handling devices generally refer to devices that are configured to accept and/or dispense currency. Cash handling devices include payment kiosks, point of sale systems such as cash registers, automated teller machines (ATMs), currency recyclers and the like. Currency recyclers generally refer to cash handling devices that are configured to dispense the same currency that was earlier deposited. For example, if a user deposits a 5 dollar bill into a cash recycler machine, the same 5 dollar bill may be dispensed during a subsequent withdrawal transaction. Thus, using currency recyclers, deposited currency may be placed immediately back into use and circulation instead of being held or frozen until a bank is able to collect and reconcile the funds, stored indefinitely and/or taken out of circulation entirely as is the case with other current cash handling devices.

Figure 1:
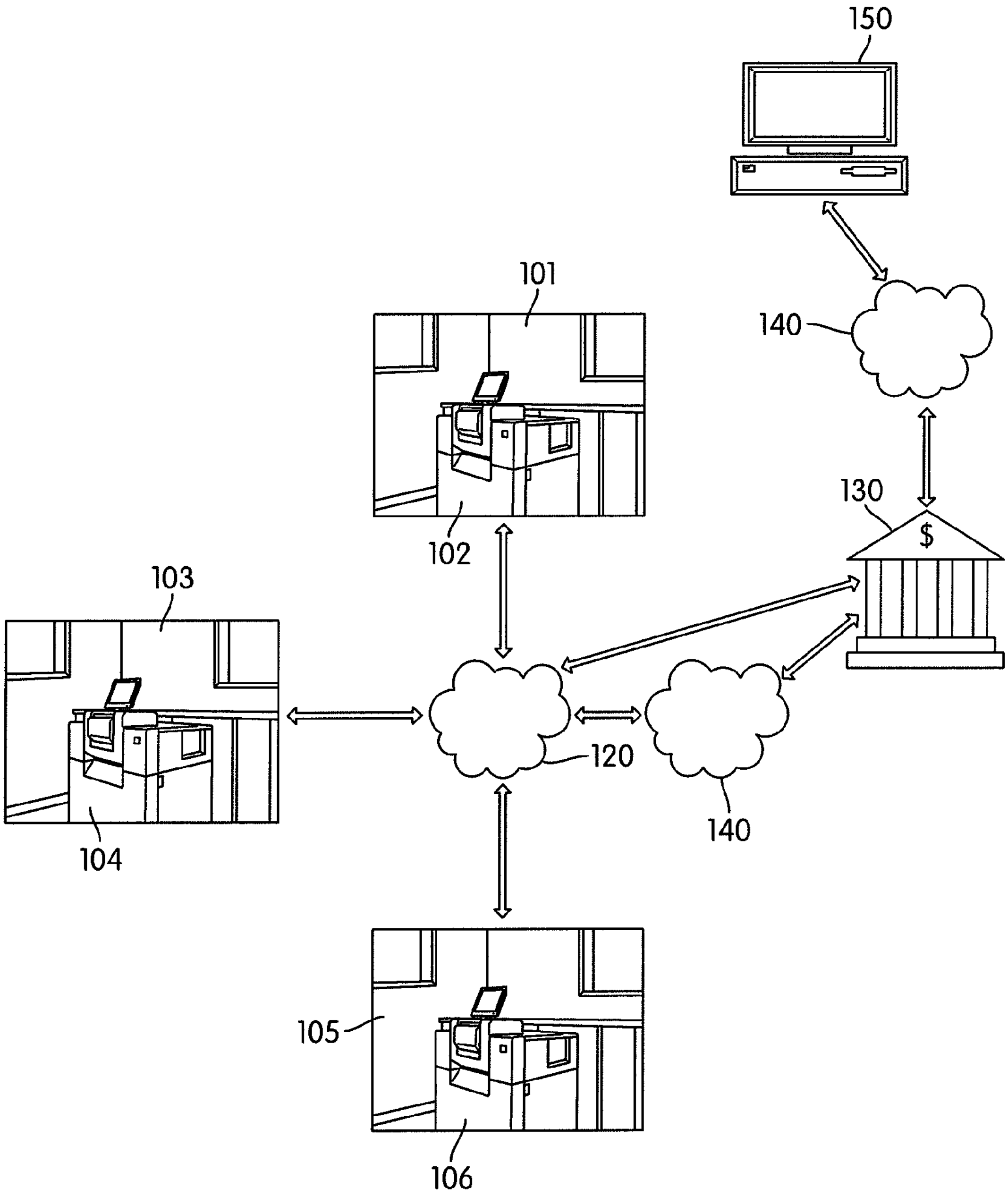
FIG. 1 illustrates an example of a suitable operating environment in which various aspects of the disclosure may be implemented.

FIG. 1 illustrates an example of a suitable operating environment in which various aspects of the disclosure may be implemented. Devices 102, 104, 106 may include currency recyclers and/or other cash handling devices and may be located at various sites such as locations 101, 103, and 105. The locations may represent different stores of a business enterprise. For example, locations 101, 103, and 105 may represent three different grocery stores located in different geographical areas belonging to a grocery store chain. Those skilled in the art will realize that additional cash handling devices may be located in the same store or in other stores belonging to the grocery store chain. In addition, those skilled in the art will realize that a grocery store chain is only one illustrative example of the types of locations or businesses that cash handling devices such as recyclers may be located. For example, cash recyclers may also be located in gas stations, post offices, department stores, and other places where cash and other financial instruments are deposited or withdrawn.

FIG. 1 further illustrates that cash handling devices 102, 104, and 106 may be connected to a communications network such as communications network 120. Communications network 120 may represent: 1) a local area network (LAN); 2) a simple point-to-point network (such as direct modem-to-modem connection); and/or 3) a wide area network (WAN), including the Internet and other commercial based network services.

Cash handling devices 102, 104, and 106 may communicate with one another or with a financial institution such as bank 130 via communication network 120 in various manners. For example, communications between cash handling devices 102, 104, 106 and bank 130 may use protocols and networks such as TCP/IP, Ethernet, FTP, HTTP, BLUETOOTH, Wi-Fi, ultra wide band (UWB), low power radio frequency (LPRF), radio frequency identification (RFID), infrared communication, IrDA, third-generation (3G) cellular data communications, Global System for Mobile communications (GSM), or other wireless communication networks or the like. Communications network 120 may be directly connected to a financial institution such as bank 130. In another embodiment, communications network 120 may be connected to a second network or series of networks 140 before being connected to bank 130. According to one or more arrangements, bank 130 may utilize an infrastructure which includes a server 150 having components such as a memory, a processor, a display, and a communication interface.

Cash recycler 200 may further provide display 213 to present data and/or messages to a user. For example, display 213 may be configured to display a recycler balance, a transaction interface, a current deposit count, security options, transportation options and the like. One or more input devices 254 such as a keypad, keyboard, mouse, touchscreen, fingerprint scanner, retinal scanner, proximity card reader, RFID scanner and/or writer, magnetic card reader, barcode reader, and/or combinations thereof, or any other type of input device or reader capable of inputting, reading, or scanning indicia or information, may also be included in or connected to recycler 200. One or printers 256 may also be included in or connected to recycler 200 for printing receipts and notifications as well.

In cash recycler 200, stackers 217 and cartridges 215 are configured to store currency. Currency may be inserted through input slot 209 and withdrawn through withdrawal slot 211. Stackers 217 may be used to store and organize currency based on denomination. For example, all $5 bills may be stored in stacker 2 (i.e., stacker 217B) while all $20 bills may be stored in stacker 3 (i.e., stacker 217C). Cartridges 215A and 215B, on the other hand, may be used to store overflow currency and/or currency for transport. Thus, if stackers 217 become full, additional currency that is deposited into recycler 200 may be stored in an overflow cartridge such as cartridge 215B. One of cartridges 215 may be designated as a transport cartridge that stores currency to be withdrawn from the machine and transported to the bank. Alternatively or additionally, one or more of cartridges 215 may be used as an unfit bill store for currency determined to be defective to a degree that it should be taken out of circulation. Cartridges 215 and stackers 217 may further be removable for easier access or transport.

One or more separate audit cartridges or bins 258 may be used to store currency during audits. Oftentimes, this type of cartridge 258 may be used to temporarily store currency as it comes and goes from each stacker or roller during verification.

Scanning unit 207 may be configured to scan each bill or currency that is inserted into recycler 200. Scanning unit 207 may be configured to detect defects, counterfeits, denomination, type of currency (e.g., which country the currency originates from) and the like. Scanning unit 207 may further be configured to refuse money (either through input slot 209 or withdrawal slot 211) if it cannot be properly recognized or if the currency is deemed to be counterfeit. Scanning unit 207 may send such data to processor 201 which may, in turn, save the data in memory 203.

Further, recycler 200 may include one or more mechanical or electromechanical systems (not shown) for automatically transferring currency between stackers 217, cartridges 215, input slot 209 and withdrawal slot 211 in recycler 200. For example, currency may automatically be withdrawn from stackers 217 and directed into cartridge 215A for storage using a series of motorized rollers. In another example, currency stored in cartridge 215A may be withdrawn and organized and stored into stackers 217 according to denomination. Using such systems to facilitate the automated movement of currency between storage components and other portions of recycler 200 may provide efficiency and security by alleviating some of the need to manually handle currency stored within recycler 200.

Figure 2:
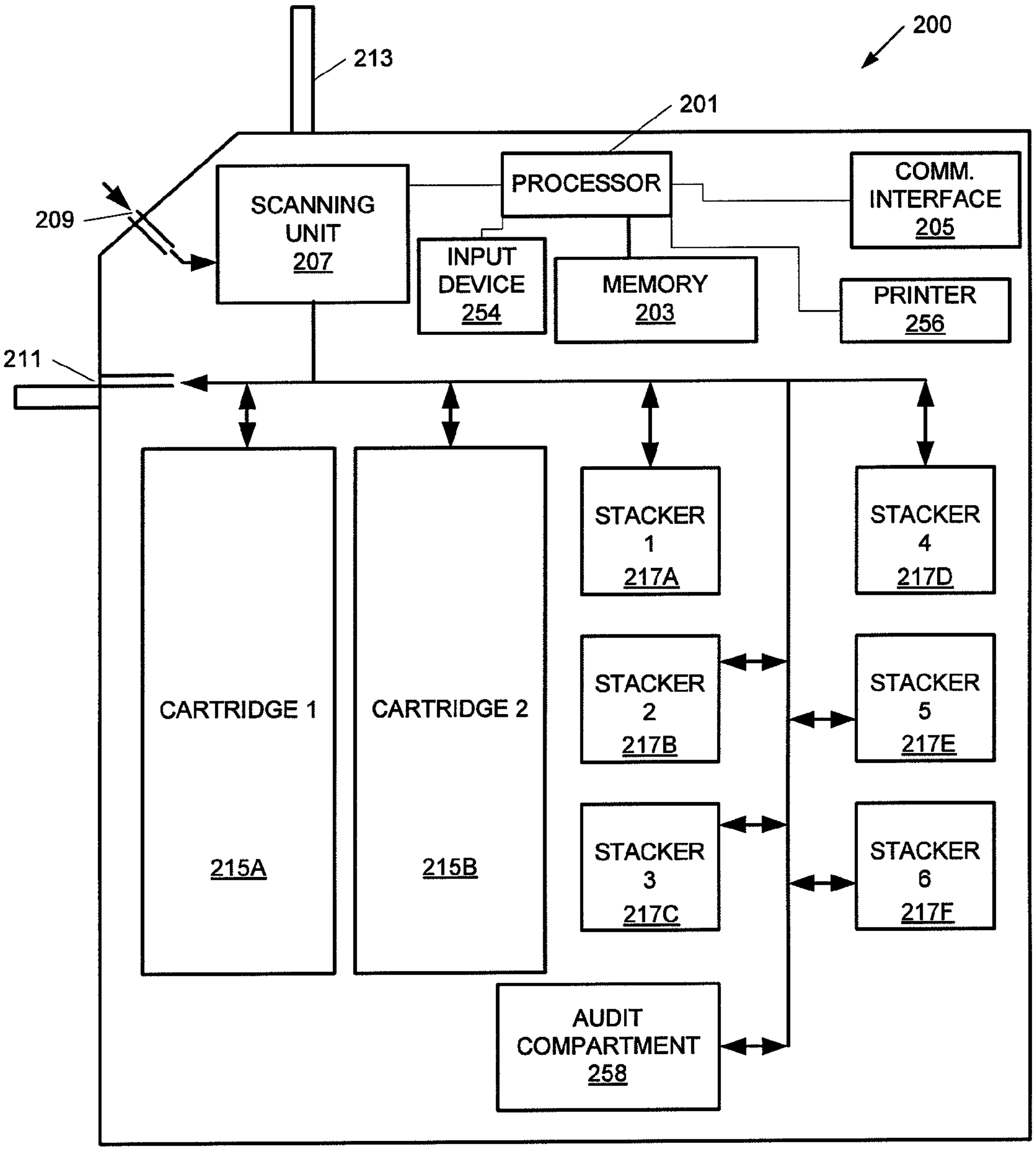
FIG. 2 illustrates a simplified diagram of a cash handling device in accordance with an aspect of the invention.
Figure 3:
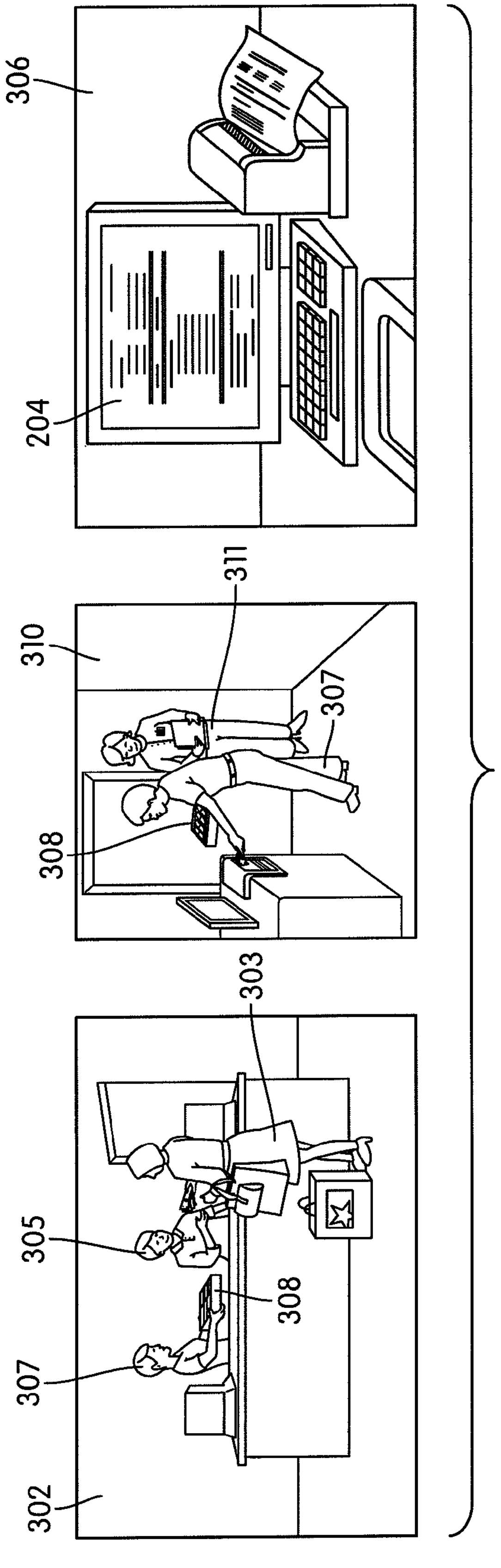
FIG. 3 illustrates various features of a cash handling device that may be used in accordance with aspects of the invention.

FIG. 3 illustrates various features of cash recycler, such as cash recycler 200 of FIG. 2, used in various aspects of the invention. The images in FIG. 3 depict use of a single cash recycler 200 in a retail environment. The retail owner may have a cash recycler 200 located in each of their stores. In an aspect of the invention, summary information for the retail owner's stores may be available via an interface to the financial institution. In another embodiment, access to summary information may be available directly from each of the cash recyclers 200.

In FIG. 3, image 302 depicts customer 303 paying cash to a retail employee such as store cashier 305 for a purchase. Another store cashier 307 at a recently closed cash register may be carrying a cash drawer or till 308 to a back office for reconciliation. In image 310, store cashier 307 may load currency from cash register till 308 into cash recycler 200. In addition, store cashier 307 may also deposit other paper forms of payment received from customer such as checks. An office manager 311 may be supervising cashier 307 during the loading of cash register till 308 into cash recycler 200. Moreover, upon the start of a shift a cashier may fill his/her cash register till with a designated amount of currency dispensed from cash recycler 200.

In image 306 of FIG. 3, a display screen (e.g., display 213 of cash recycler 200 of FIG. 2) may show the total amount entered into cash recycler 200 from till 308. The display screen 213 may breakout the amount entered into cash recycler 200 by denomination and by each cashier. The total amount deposited and withdrawn from cash recycler 200 may be shown on display screen 213.

Figure 4:
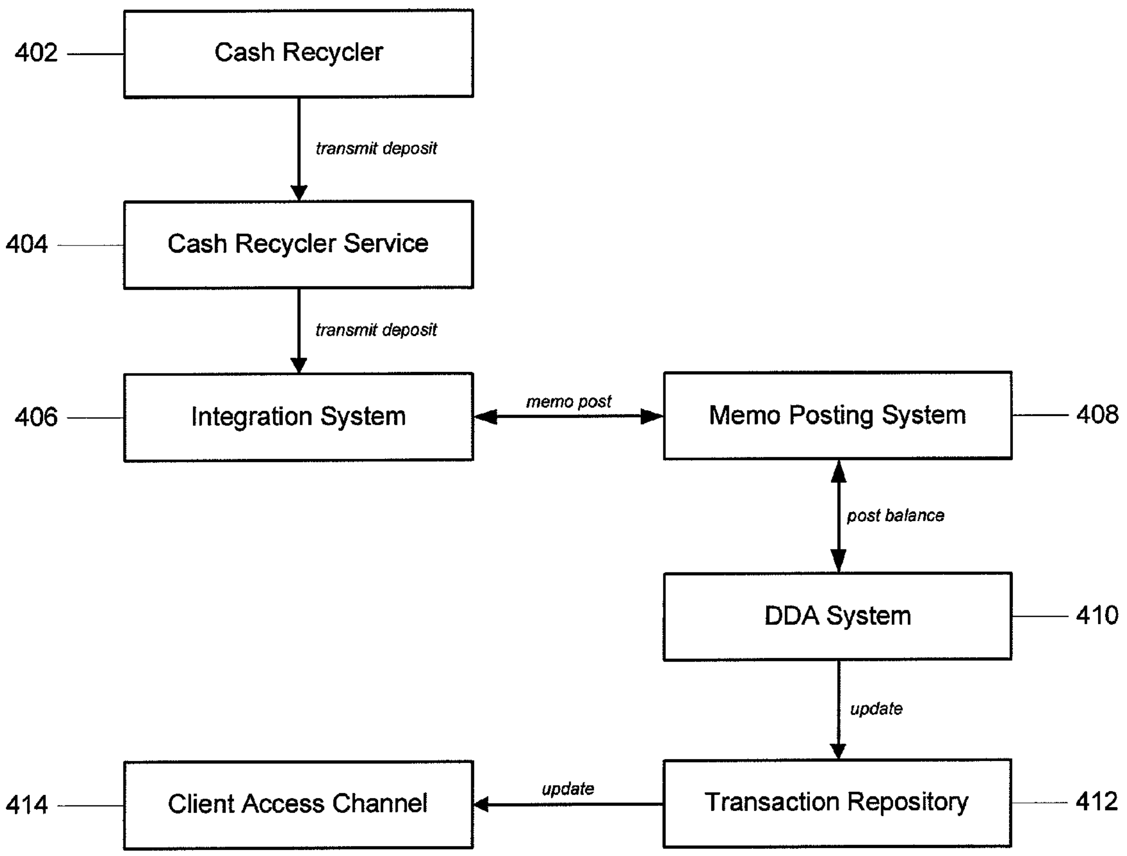
FIG. 4 illustrates a system configuration that may be used in accordance with an aspect of the invention.

FIG. 4 illustrates a system configuration that may be used in accordance with an aspect of the invention. In FIG. 4 a cash recycler 402 may communicate information to cash recycler service 404 located at a remote location. For example, cash recycler 402 may communicate deposit and withdrawal information from an enterprise location (e.g., a retail store) to the remote cash recycler service 404. The information may be routed through various networks such as the Internet to reach the cash recycler service. The cash recycler service 404 may be located in the data center of a financial institution. The cash recycler service 404 may communicate with an integration system 406 which provides access to the financial systems and processes. The integration system 406 may communicate with a memo posting system 408 which may perform posting activity. The posting system 408 may update the appropriate DDA (direct deposit account) system 410 to reflect the balance changes in the enterprises account balances. The DDA system 410 may also update a transaction repository 412 for historical and intra-day reporting purposes. An enterprise employee may access information stored in the transaction repository 412 through a client access channel 414 via web browser. Those skilled in the art will realize that the financial institution may allow the enterprise user to access the information stored in the transaction repository via numerous alternative communication methods.

According to one aspect, cash recyclers such as cash recycler 102 (FIG. 1) and 200 (FIG. 2) and other cash handling devices may facilitate real-time recognition of funds. In particular, funds deposited at a recycler or other cash handling device at a client site may be recognized by a bank at the time the deposit is made. Recognition refers to the real credit (i.e., not provisional) of deposited funds into a client's account. In contrast to current systems, there is no delay between a deposit of funds and when the funds and transaction data are submitted to the bank for recognition. Thus, instead of having to wait until the end of the day or another prescheduled time for deposits and/or withdrawals to be recognized by the bank, each deposit is processed for recognition in real-time. Data regarding the withdrawal or deposit transaction may be transmitted through a data network to the bank for recognition and processing. Providing real-time recognition offers may advantages including the ability for a client to withdraw the same currency that was earlier deposited for use in the client's operations, all at the client site and without having to first transport the deposited funds to the bank for recognition. Currency recyclers, recycling management and recognition of funds are further described in U.S. application Ser. No. 11/614,656, entitled "Commercial Currency Handling and Servicing Management," filed on Dec. 21, 2006, the content of which is incorporated herein by reference in its entirety.

Figure 5:
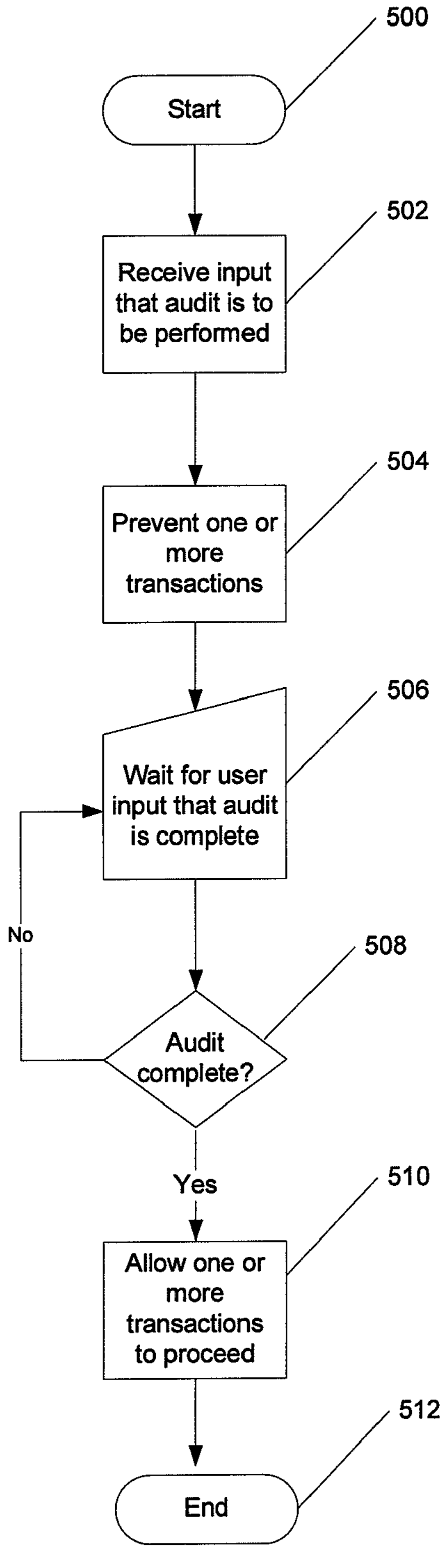
FIG. 5 illustrates an example method of implementing security in order to prevent transaction activity until an audit is complete.

FIG. 5 illustrates an example method of implementing security in order to prevent transaction activity until an audit is complete. Upon start 500, a cash handling device (e.g., cash recycler, and the like) 102, 104, 106 may receive an input from a user 307. This input may indicate that an audit of the cash handling device is to be performed 502. The input may be received from a keypad, keyboard, pressing an applicable portion or button of a touch-sensitive display, a barcode scanner, magnetic card reader, use of a proximity card, an RFID tag or device, a microphone, or the like.

After an input is received indicating that an audit of the cash handling device is to be performed 502, the cash handling device may prevent one or more transactions from taking place 504 until after the audit is completed.

In certain embodiments, the input to have an audit occur can also be triggered by a specific activity or on a timed schedule. The audit functionality may also be conducted without human intervention where movement of cash may occur one stacker/roller at a time to an empty and separate stacker/roller for verification and then may be replaced to the original stacker/roller. The process may be repeated until all stacker/rollers are completed.

In some embodiments, all transactions on the cash handling device may be locked out (i.e., prevented). In other embodiments, only some transactions on the cash handling device may be locked out.

Once in lockout mode, the cash handling device may wait for user input indicating that the audit has been completed 506. Upon receiving input, the cash handling device may determine whether the input indicates that the audit has been completed 508. If it has not been completed, the cash handling device may continue to wait 506. If the audit has been completed, the cash handling device may allow some or all further transactions to be performed 510. At this point, the process on the cash handling device may end.

Although not required, one of ordinary skill in the art will appreciate that various aspects described herein may be embodied as a method, a data processing system, or as one or more computer-readable media storing computer-executable instructions. Accordingly, those aspects may take the form of an entirely hardware embodiment, an entirely software embodiment or an embodiment combining software and hardware aspects. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

We claim:

1. A method comprising:

receiving, by a cash handling device, a first selection indicating that an audit is to be performed;

preventing, by the cash handling device, a first type of transaction after receiving the first selection until the audit is complete; and processing, by the cash handling device, a second type of transaction after the audit has commenced and before the audit is complete, wherein the first type of transaction comprises a type of transaction that is one of the following two types of transaction: a withdrawal transaction and a deposit transaction.

2. The method of claim 1 further comprising processing, by the cash handling device, a second selection indicating that the audit is complete.

3. The method of claim 2 wherein the cash handling device is a cash recycler.

4. The method of claim 2 further comprising processing, by the cash handling device, the first type of transaction after the audit is complete.

5. The method of claim 3 wherein the cash handling device is a cash recycler.

6. The method of claim 1 wherein the cash handling device is a cash recycler.

7. The method of claim 1, wherein the audit comprises an audit of a plurality of stackers of the cash handling machine.

8. The method of claim 7, wherein the audit comprises:

moving cash from a first stacker of the plurality of stackers to a second stacker of the plurality of stackers, wherein the second stacker is previously empty and separate from the first stacker;

verifying the cash at the second stacker that was moved from the first stacker;

returning the cash to the first stacker from the second stacker;

moving cash from a third stacker of the plurality of stackers to the second stacker;

verifying the cash at the second stacker that was moved from the third stacker; and returning the cash to the third stacker from the second stacker.

9. An apparatus comprising:

a processor configured to execute computer-executable instructions;

memory that stores the computer-executable instructions;

a display; and an input device configured to receive user input;

wherein the computer executable instructions are configured to cause the apparatus to perform at least the following:

receive a first user input to the input device, the first user input indicating that an audit is to be performed prevent a first type of transaction after receiving the first user input until the audit is complete; and process a second type of transaction after the audit has commenced and before the audit is complete, wherein the first type of transaction comprises a type of transaction that is one of the following two types of transaction: a withdrawal transaction and a deposit transaction.

10. The apparatus of claim 9 wherein the apparatus comprises a cash handling device.

11. The apparatus of claim 10, wherein the cash handling machine comprises a cash recycler.

12. The apparatus of claim 11 wherein the input device and display include a touch sensitive screen.

13. The apparatus of claim 11 wherein the input device includes a touch-sensitive screen.

14. The apparatus of claim 11 wherein the display includes a touch sensitive screen.

15. The apparatus of claim 11 wherein the input device includes a keypad.

16. The apparatus of claim 11 wherein the input device includes a keyboard.

17. The apparatus of claim 9, wherein the computer executable instructions are configured to cause the apparatus to:

receive a second input to the input device, the second input indicating that the audit is complete; and process the first type of transaction after receiving the second input.

18. A non-transitory computer-readable storage medium storing computer-executable instructions that, when executed, cause a cash handling device, the cash handling device comprising a processor, to perform at least the following:

receiving a first selection indicating that an audit is to be performed;

preventing a first type of transaction after receiving the first selection until the audit is complete; and processing a second type of transaction after the audit has commenced and before the audit is complete, wherein the first type of transaction comprises a type of transaction that is one of the following two types of transaction: a withdrawal transaction and a deposit transaction.

19. The non-transitory computer-readable medium of claim 18, wherein the computer-executable instructions, when executed, cause the cash handling machine to further perform:

receiving a second selection indicating that the audit is complete.

20. The non-transitory computer-readable medium of claim 19, wherein the computer-executable instructions, when executed, cause the cash handling machine to perform:

allowing the first type of transaction to proceed after receiving the second selection.

* * * * *